J. B. DRUMM.
SPRING ROLLER.
APPLICATION FILED MAY 15, 1916.
1,228,303.
Patented May 29, 1917.
2 SHEETS—SHEET 1.
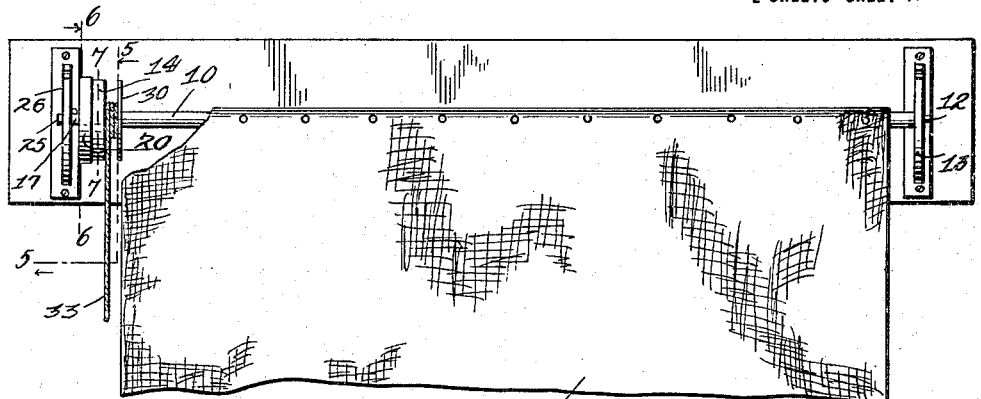
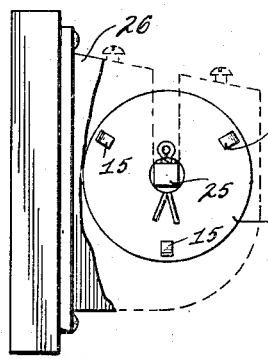
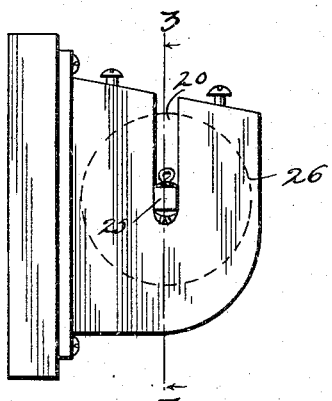
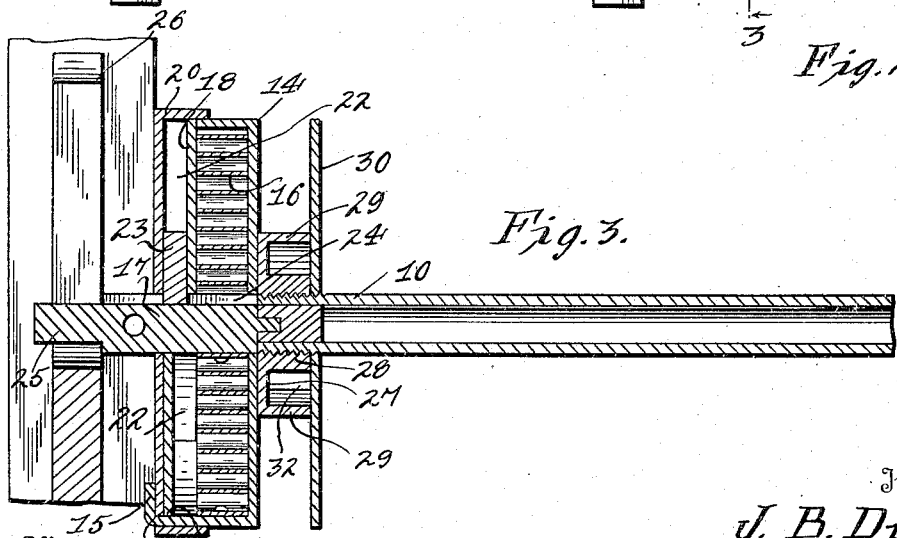
Inventor
J. B. Drumm.
Attorneys

J. B. DRUMM.
SPRING ROLLER.
APPLICATION FILED MAY 15, 1916.

1,228,303.

Patented May 29, 1917.
2 SHEETS—SHEET 2.

Witnesses
Inventor
J. B. Drumm
By
Attorneys

UNITED STATES PATENT OFFICE.

JOHN B. DRUMM, OF WINSLOW, ARIZONA.

SPRING-ROLLER.

1,228,303.  Specification of Letters Patent.  Patented May 29, 1917.

Application filed May 15, 1916. Serial No. 97,658.

*To all whom it may concern:*

Be it known that I, JOHN B. DRUMM, a citizen of the United States, residing at Winslow, in the county of Navajo, State of Arizona, have invented certain new and useful Improvements in Spring-Rollers; and I do hereby declare the following to be a full, clear, and exact description of the invention, such as will enable others skilled in the art to which it appertains to make and use the same.

This invention relates to improvements in spring rollers for shades, curtains, awnings or the like.

One object of the invention is to provide an improved construction of the automatic rewinding feature of a shade or awning roller which is adapted for attachment to one end of the roller whereby the special construction of the roller is obviated.

Another object is to provide a novelly constructed device for supporting and guiding the detents.

Other objects and advantages will be apparent from the following description when taken in connection with the accompanying drawing.

In the drawing:

Figure 1 is an elevation of an automatic spring roller made in accordance with my invention, Fig. 2 is an end view, Fig. 3 is an enlarged vertical section on the line 3—3 of Fig. 2, Fig. 4 is an end view of the device showing its position in a bracket, the latter being partly broken away and outlined in dotted lines.

Figure 6:
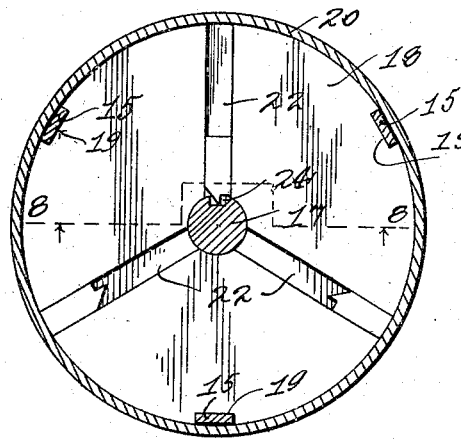
Fig. 6 is a transverse section on the line 6—6 of Fig. 1.
Figure 5:
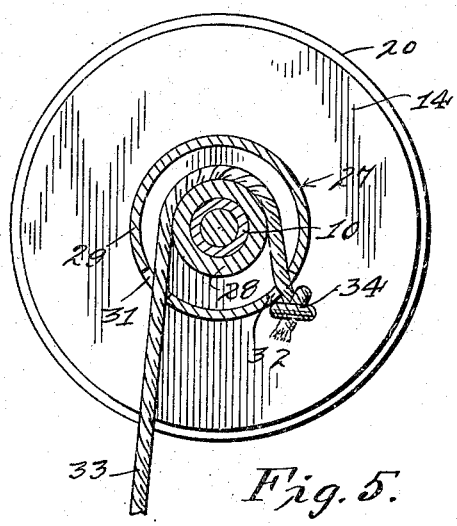
Fig. 5 is a vertical section on the line 5—5 of Fig. 1.
Figure 8:
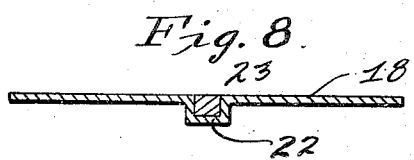
Fig. 8 is a transverse section through the pawl holding disk.
Figure 7:
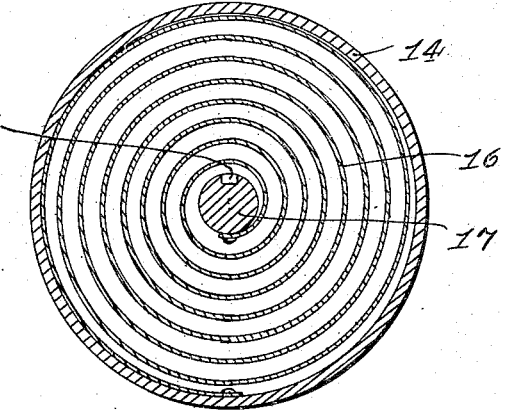
Fig. 7 is a section on the line 7—7 of Fig. 1.

Referring particularly to the accompanying drawing, 10 represens the roller on which is wound the web 11 of a curtain shade or awning. One end of this roller is provided with the usual round pintle 12 for engagement in the slot of the bracket 13. Secured to the other end of the roller is a cap 14, the flange of which is formed with a plurality of tongues 15. Within this cap is a coil spring 16, one end being secured to the cap while the other is secured to stub axle 17 secured in the end of the roller and extending centrally through the cap. Disposed within the outer edge of the flange of the cap is a disk 18, in the periphery of which there are formed notches 19 of a number equal to the number of tongues 15, and receiving the tongues therethrough. A second cap 20 is engaged over the outer edge of the flange of the cap 14 and is provided with a plurality of slots 21 through which the tongues 15 are also passed and then bent against the outer face of the cap 20. Pressed into the face of the disk 18 are a plurality of radially extending channels 22 in which are disposed the slidable pawls 23 adapted for engagement in a groove 24 formed in the axle 17. The axle is formed with a reduced end 25 which passes through a central opening in the cap 20, this reduced end being flattened and arranged to pass into the slot of the bracket 26.

It will be noted that the disk 18 has its channeled face disposed against the inner face of the cap 20, thus confining the pawls 23 within the channels, but permitting them to readily slide longitudinally therein and to successively engage their noses in the groove of the axle as the device is rotated. Carried by the cap 14, and receiving the adjacent end of the roller is a member 27 which is formed with a central boss 28 receiving the roller and a longitudinally extending peripheral flange 29. A disk 30 is engaged on the roller between the edge of the web and the member 27. In this flange 29 there are formed two openings 31 and 32, through which is passed the operating cord 33, the same having one of its ends provided with a knot 34 held within the opening 32.

When the shade is completely wound, this cord is wound on the flange of the member 27, and it will thus be seen that upon pulling on the cord, the roller will be turned to wind up the spring and unwind the shade at the same time, the pawls 23 engaging successively in the groove of the axle to hold the roller at different points in its rotation.

What is claimed is:

In a spring roller, a roller proper, a cap member secured to one end of the roller, a grooved axle carried by the end of the roller and passing through the cap, the flange of said cap having a plurality of tongues, a disk disposed inwardly of the edge of the flange of the cap and provided with notches in its peripheral edge receiving the said tongues therethrough to prevent rotation of the disk relative to the cap and a cap engaged on the flange of the first cap and having slots receiving the tongues therethrough to prevent rotation of the caps relative to each other, said tongues having their ends bent to lie against the second cap and lock said caps and disk together.

In testimony whereof, I affix my signature, in the presence of two witnesses.

JOHN B. DRUMM.

Witnesses:
J. N. PEMBERTON,
G. E. CORNELIUS.